(12) United States Patent
Bonardi

(10) Patent No.: US 12,037,204 B2
(45) Date of Patent: Jul. 16, 2024

(54) CAROUSEL MACHINE FOR PROCESSING CONTAINERS

(71) Applicant: P.E. LABELLERS S.P.A., Porto Mantovano (IT)

(72) Inventor: Luca Bonardi, San Giorgio di Mantova (IT)

(73) Assignee: P.E. Labellers S.P.A., Porto Mantovano (IT)

( * ) Notice: Subject to any disclaimer, the term of this patent is extended or adjusted under 35 U.S.C. 154(b) by 559 days.

(21) Appl. No.: 17/421,531

(22) PCT Filed: Dec. 18, 2019

(86) PCT No.: PCT/EP2019/085894
§ 371 (c)(1),
(2) Date: Jul. 8, 2021

(87) PCT Pub. No.: WO2020/144019
PCT Pub. Date: Jul. 16, 2020

(65) Prior Publication Data
US 2022/0081224 A1    Mar. 17, 2022

(30) Foreign Application Priority Data
Jan. 10, 2019   (IT) .......................... 102019000000334

(51) Int. Cl.
*B65C 9/00*       (2006.01)
*B65C 9/04*       (2006.01)
*B65G 47/84*      (2006.01)

(52) U.S. Cl.
CPC .......... *B65G 47/846* (2013.01); *B65C 9/0062* (2013.01); *B65C 9/04* (2013.01); *B65G 2201/0235* (2013.01)

(58) Field of Classification Search
CPC ............................ B65G 47/846; B65C 9/0062
See application file for complete search history.

(56) References Cited

U.S. PATENT DOCUMENTS

2005/0153427 A1   7/2005   Eder et al.
2006/0265947 A1   11/2006  Siedlaczek
(Continued)

FOREIGN PATENT DOCUMENTS

CN    102933463 A    2/2013
DE    20310030 U1    4/2004
(Continued)

OTHER PUBLICATIONS

European Patent Office (ISA/EP), International Search Report, International Application No. PCT/EP2019/085894, 3 pages, Mar. 2, 2020.
(Continued)

*Primary Examiner* — Philip C Tucker
*Assistant Examiner* — John Blades
(74) *Attorney, Agent, or Firm* — Thompson Hine LLP

(57) ABSTRACT

A carousel machine for processing containers, which comprises a supporting structure for supporting a rotating carousel for the conveyance of containers to be processed which is provided, at the peripheral region of the carousel, with at least one station for processing the containers in transit on the carousel, which is supported by a respective footing which is connected to the supporting structure; the footing is mounted in a cantilever fashion jutting out from the peripheral region of the supporting structure and comprises a pair of monolithic supporting elements; each one of the monolithic elements comprises a respective tubular body, which has, on its outer lateral surface, at least one longitudinal seat which defines at least one abutment region for the coupling of removable connection structure and for the connection of handling structure for moving the processing station with respect to the carousel.

7 Claims, 5 Drawing Sheets

(56) References Cited

U.S. PATENT DOCUMENTS

| | | | |
|---|---|---|---|
| 2009/0301662 A1* | 12/2009 | Ferri | B65C 9/0062 |
| | | | 156/538 |
| 2013/0139969 A1* | 6/2013 | Giuliani | B65C 9/40 |
| | | | 156/352 |
| 2013/0139970 A1* | 6/2013 | Cordioli | B65C 9/0062 |
| | | | 156/365 |
| 2013/0292230 A1 | 11/2013 | Marcantoni | |
| 2013/0319596 A1* | 12/2013 | Cattabriga | B65C 9/02 |
| | | | 156/60 |
| 2014/0048206 A1 | 2/2014 | Giuliani | |
| 2014/0124646 A1 | 5/2014 | Cordiol | |
| 2015/0020978 A1 | 1/2015 | Cordioli | |
| 2017/0334595 A1 | 11/2017 | Saccardi | |

FOREIGN PATENT DOCUMENTS

| | | |
|---|---|---|
| EP | 2712820 A1 | 4/2014 |
| EP | 2712820 A1 | 4/2014 |
| EP | 2778082 A1 | 9/2014 |
| EP | 2778082 A1 | 9/2014 |
| JP | 2011152958 A | 8/2011 |
| JP | 2014520731 A | 8/2014 |
| WO | 2013/131587 A1 | 9/2013 |

OTHER PUBLICATIONS

European Patent Office (ISA/EP), Written Opinion of the International Searching Authority, International Application No. PCT/EP2019/085894, 6 pages, Mar. 2, 2020.

Ministry of Economic Development, Search Report and Written Opinion (with English translation), Italian Patent Application No. 2019000000334, 8 pages, Oct. 10, 2019.

* cited by examiner

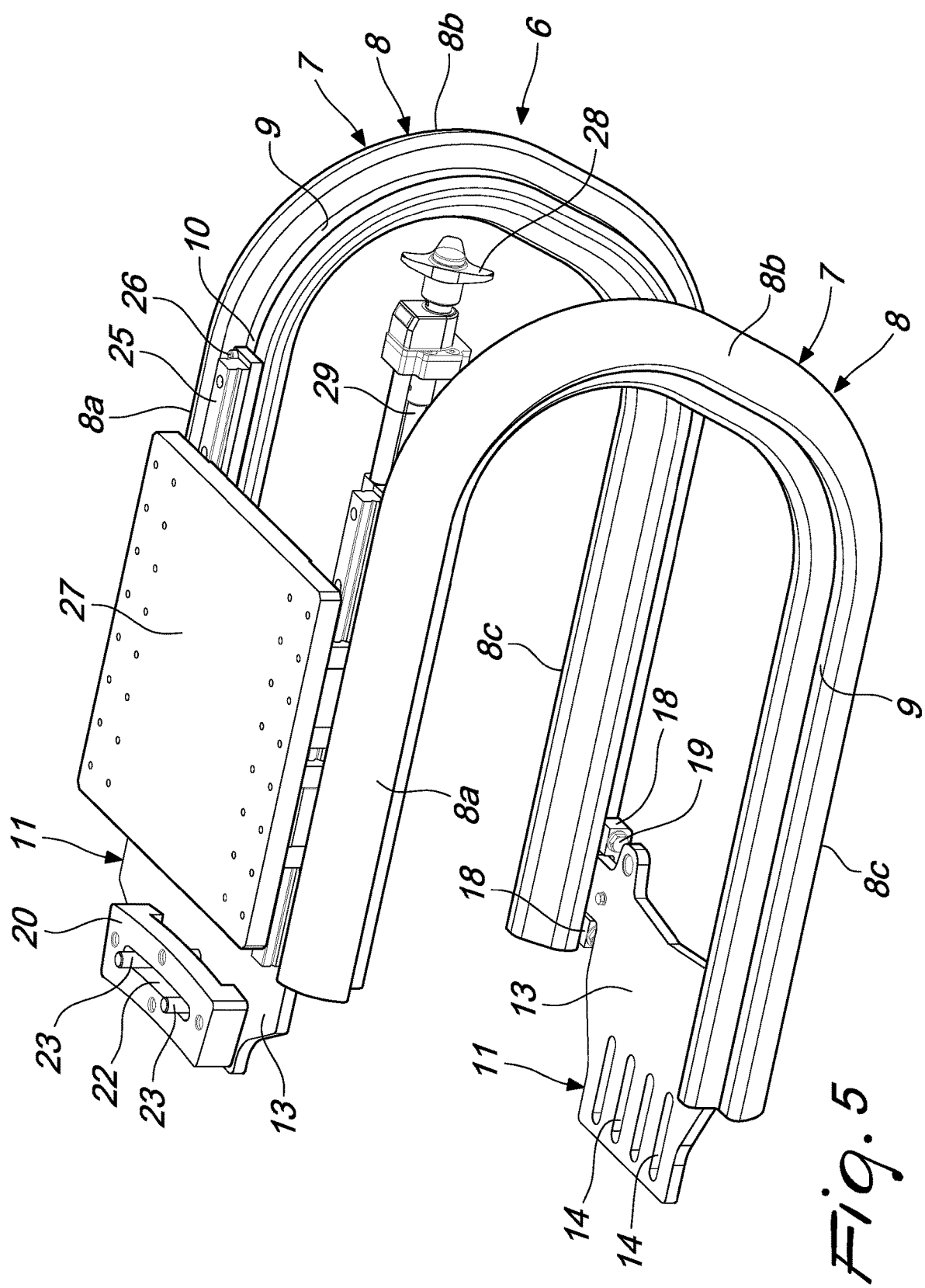

CAROUSEL MACHINE FOR PROCESSING CONTAINERS

The present invention relates to a carousel machine for processing containers.

As is known, nowadays there are carousel machines on the market for processing containers, which have a supporting structure on which a rotating carousel is mounted so that it can rotate which conveys the containers to be processed and which has, at the peripheral region of the carousel, one or more stations for processing the containers in transit on the carousel, which are constituted, for example, by an assembly for labeling containers.

Each station for processing is supported by a respective footing, which is locked onto the supporting structure of the carousel.

Typically, the footing of each one of the processing stations is provided by way of a respective ledge extending outward from the supporting structure of the carousel and which is, in particular, provided by a plate coupled in a cantilever fashion at one of its ends to the supporting structure of the carousel and connected to the floor by a vertical supporting foot which is arranged at its opposite, free end.

This embodiment presents drawbacks which are linked both to the radial space occupation of the ledges and to the fact that the presence of the vertical supporting foot constitutes a hindrance for the feet of the operators, which limits their free movement around the machine.

The aim of the present invention is to provide a carousel machine for processing containers which is capable of improving the known art in one or more of the above mentioned aspects.

Within this aim, an object of the invention is to provide a carousel machine for processing containers in which the footings of the corresponding stations for processing the containers are of small encumbrance and are free from elements that could hinder the movement of the operators around the machine.

Another object of the invention is to provide a carousel machine for processing containers which is simple and practical in construction.

Another object of the present invention is to provide a carousel machine for processing containers which is reliable and safe in operation.

A further object of the present invention is to overcome the drawbacks of the known art in an alternative manner to any existing solutions.

Another object of the invention is to provide a carousel machine for processing containers which can be provided at low cost.

This aim and these and other objects which will become better apparent hereinafter are achieved by a carousel machine for processing containers according to claim 1, optionally provided with one or more of the characteristics of the dependent claims.

Further characteristics and advantages of the invention will become better apparent from the detailed description that follows of a preferred, but not exclusive, embodiment of the carousel machine for processing containers, according to the invention, which is illustrated for the purposes of non-limiting example in the accompanying drawings wherein:

FIG. 5 is an additional perspective view of the footing of FIG. 3.

Figure 1:
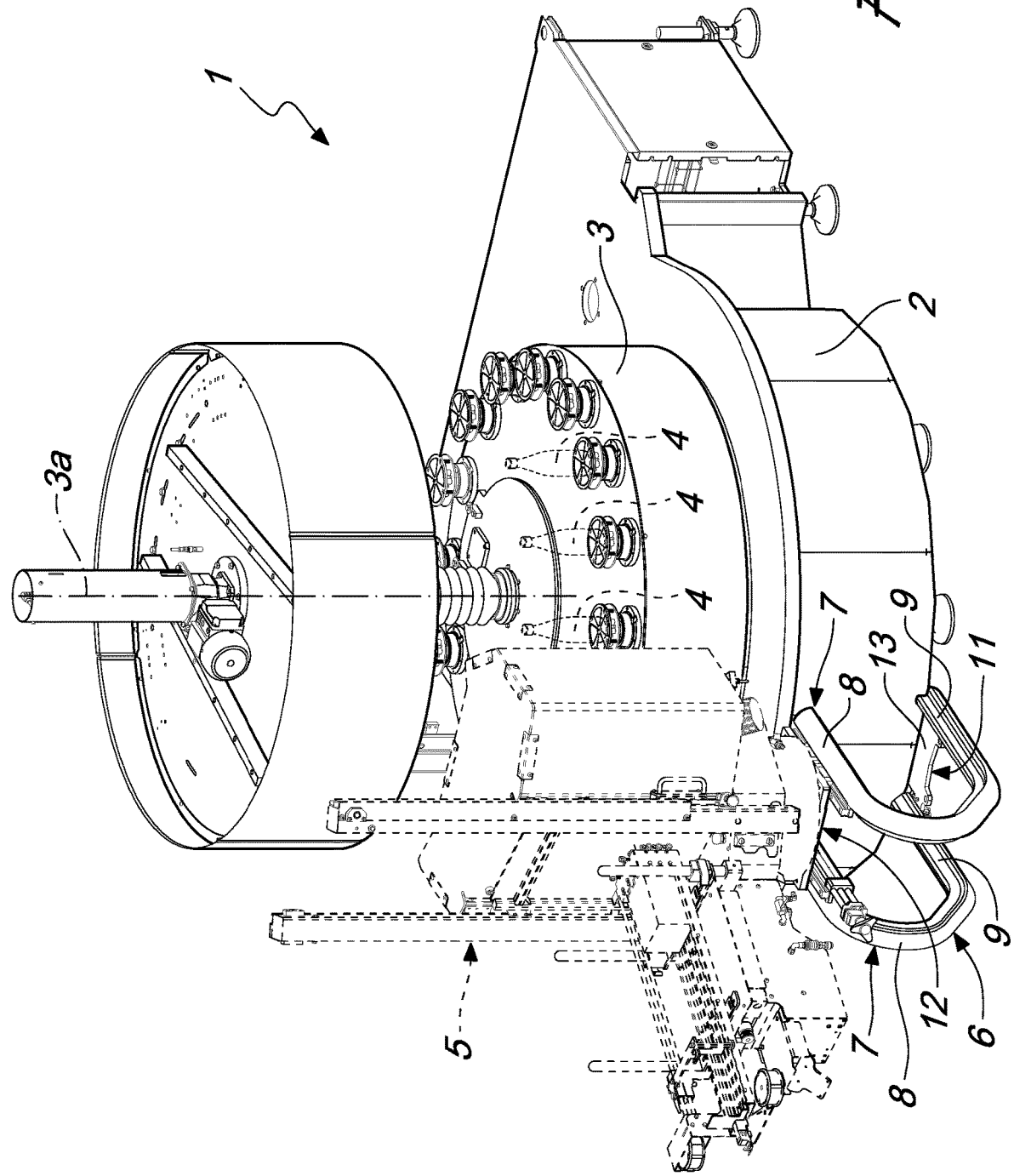
FIG. 1 is a partial perspective view of the machine according to the invention.
Figure 2:
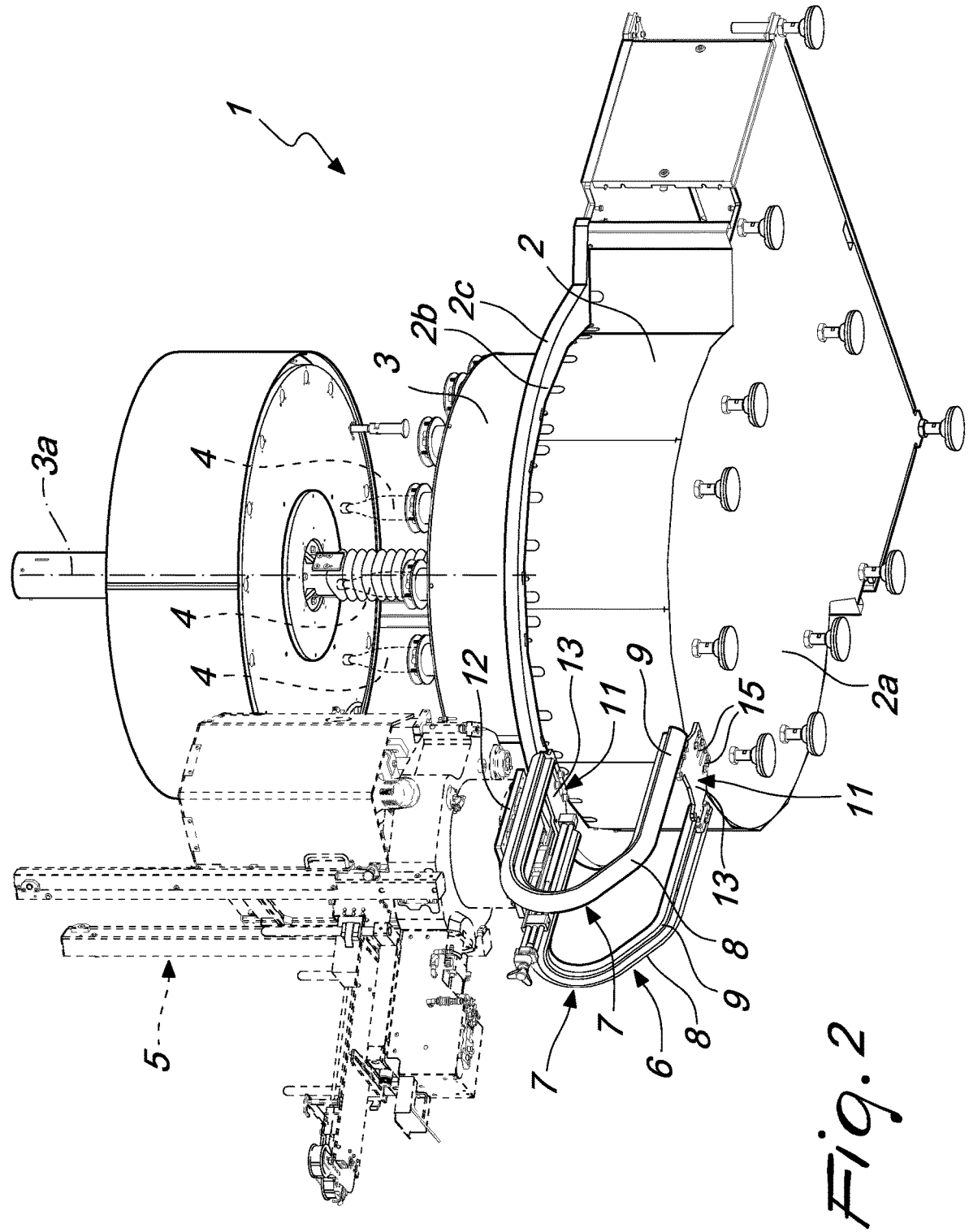
FIG. 2 is a partial perspective view of the machine seen from another angle.
Figure 3:
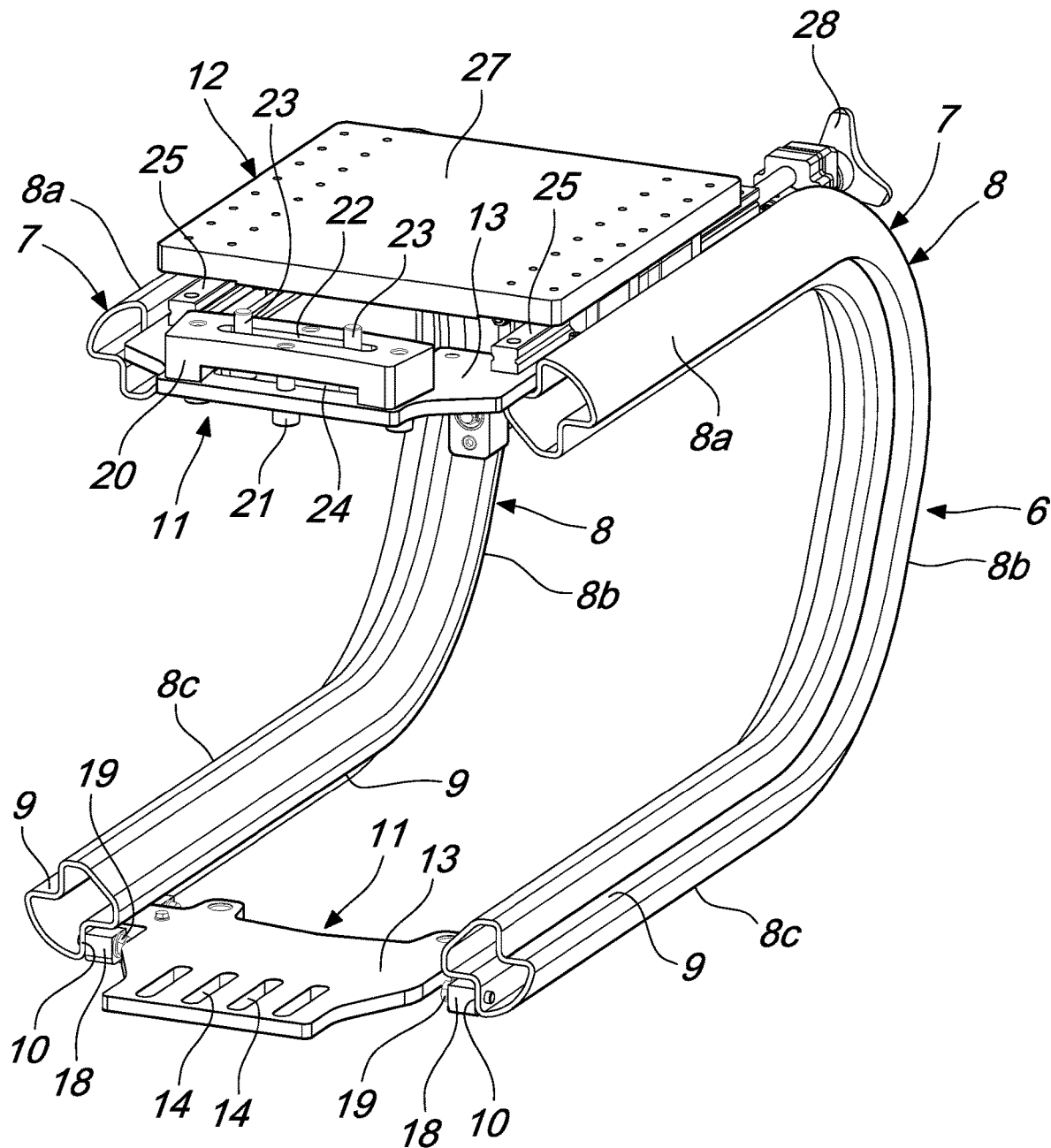
FIG. 3 is a perspective view of a footing of a processing station of the machine according to the invention.
Figure 4:
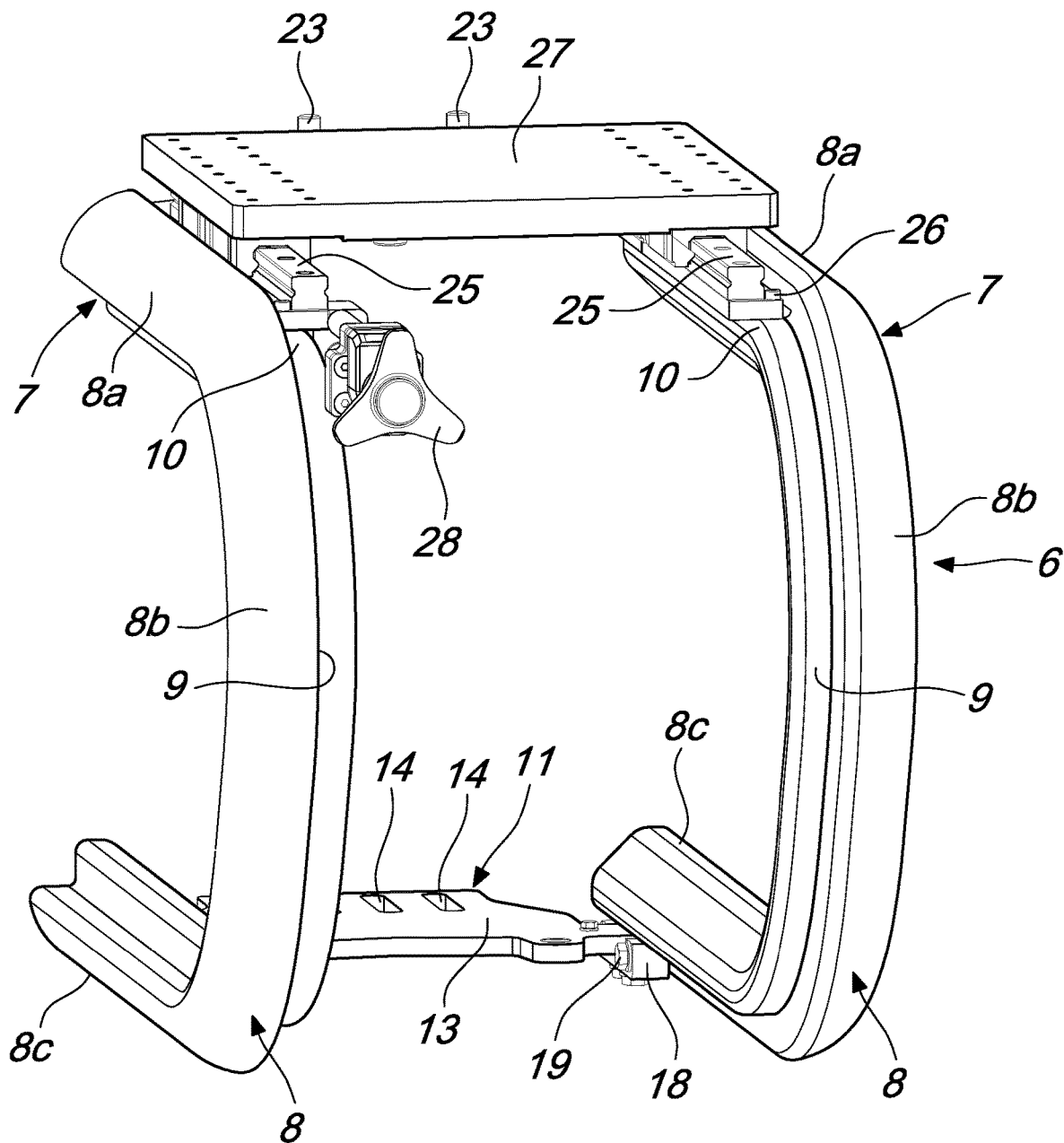
FIG. 4 is another perspective view of the footing of FIG. 3.

With reference to the figures, the carousel machine for processing containers, according to the invention, generally designated by the reference numeral 1, comprises a supporting structure 2 on which a rotating carousel 3 is mounted that rotates about a rotation axis 3a for the conveyance of containers 4 to be processed.

The machine according to the invention is provided, in particular, at the peripheral region of the carousel 3, with at least one station 5 for processing the containers 4 in transit on the carousel 3, which can be, for example, constituted by a labeling assembly or by an optical assembly for inspecting the containers 4 or the like.

In particular, the processing station 5 is supported by a respective footing 6 which is connected to the supporting structure 2, so as to be immobilized with respect thereto.

According to the invention, the footing 6 is mounted in a cantilever fashion jutting out from the peripheral region of the supporting structure 2 and comprises a pair of monolithic supporting elements 7 which lie on respective substantially vertical planes of arrangement, which face each other and are arranged substantially parallel to a direction that is substantially radial with respect to the rotation axis 3a of the carousel 3.

In particular, each one of the monolithic elements 7 comprises a respective tubular body 8, which is substantially U-shaped and is arranged so that its corresponding ends are mutually superimposed and spaced apart along a direction that is substantially parallel to the rotation axis 3a of the carousel 3 and are directed toward the supporting structure 2.

Conveniently, each tubular body 8 is constituted by a respective monolithic metallic profile which is subjected to calendering.

More specifically, the tubular body 8 of each one of the monolithic supporting elements 7 has, on its outer lateral surface, one or more longitudinal seats 9 which define one or more abutment regions 10, which enable the coupling, to the monolithic supporting elements 7, of removable connection means 11, the function of which is to provide the removable connection of the monolithic elements 7 to the supporting structure 2, as well as the connection, to the monolithic supporting elements 7, of handling means 12 for moving the processing station 5 with respect to the carousel 2.

Conveniently, the longitudinal seats 9 of each tubular body 8 are constituted by a pair of longitudinal recesses which are mutually opposite with respect to the axis of extension of the corresponding tubular body 8, which can be, advantageously, provided via the plastic deformation of the tubular body 8.

In particular, the abutment regions 10 are constituted by at least one portion of the delimiting walls of at least one of the recesses that constitute the longitudinal seats 9.

Advantageously, the removable connection means 11 comprise at least one connecting plate 13, which is arranged on a plane that is substantially perpendicular to the rotation axis 3a of the carousel 3 and is rigidly connected to the monolithic supporting elements 7, essentially in such a way as to mutually join them.

Each connecting plate 13 conveniently has at least one through opening 14 for accommodating one or more screw or bolt elements 15 for connection to the supporting structure 2.

In particular, a plurality of connecting openings (not shown for the sake of simplicity) is defined in the supporting structure 2, being distributed along the peripheral region of the supporting structure 2 and being selectively engageable by the screw or bolt elements 15, for the connection of the monolithic supporting elements 7 in the desired position along the peripheral region of the supporting structure 2.

Optionally, the or each connecting plate 13 can be connected laterally, for example by way of threaded elements 17, to a pair of supporting blocks 18, which are mutually opposite and are each mounted so as to rest against an abutment region 10 which is defined on a respective monolithic supporting element 7, to which they are, conveniently, fixed by way of screws 19.

More preferably, the removable connection means 11 are provided by a pair of connecting plates 13 which are arranged mutually spaced apart along a direction that is substantially parallel to the rotation axis 3a of the carousel 3 and are mounted on abutment regions 10 which are located proximate to the ends of the tubular bodies 8.

In more detail, there is, for example, a first connecting plate 13, arranged in a lower region, which is designed to face toward a lower face 2a of the supporting structure and which has, advantageously, slot-shaped through openings 14, which extend along a direction that is substantially perpendicular to the rotation axis 3a of the carousel 3 in order to allow the possibility of adjusting the position of the footing 6 with respect to the supporting structure 2, along such direction.

It should be noted that, conveniently, in the lower face 2a of the supporting structure 2 there are connecting openings, not shown for the sake of simplicity, which can, optionally, have a curved extension parallel to the peripheral region of the supporting structure 2, in order to allow the possibility of adjusting the angular position of the footing 6 around the supporting structure 2.

Advantageously, the second connecting plate 13, arranged in an upper region, is designed to face, in turn, a flat face 2b of the supporting structure 2 which is directed downward and is defined on a sill 2c which protrudes radially outward from the peripheral region of the supporting structure 2.

In particular, a spacer block 20 is advantageously coupled to the face of the second connecting plate 13 that is directed upward, by way of an adjustment screw 21, which makes it possible to vary its position along a direction that is substantially parallel to the rotation axis 3a of the carousel 3. Conveniently, the spacer block 20 has a through slot 22 which extends along a curve substantially parallel to the extension of the sill 2c of the supporting structure 2 and which can be passed through by one or more fixing screws 23, which are engageable in connecting openings, not shown, defined in the supporting structure 2, for example at the flat face 2b of the sill 2c, and which abut, with their heads, against the face of the spacer block 20 that is directed toward the second connecting plate 13.

Advantageously, in the region of the second connecting plate 13 that faces the spacer block 20 there is a through opening with an elongated extension 24 which makes it possible to operate from below on the heads of the fixing screws 23 for the screwing/unscrewing thereof.

As illustrated, the tubular bodies 8 of the monolithic supporting elements 7 have upper portions 8a which have a substantially horizontal extension, and the handling means 12 are mounted on abutment regions 10 which are located along such upper portions 8a.

In more detail, the handling means 12 are, conveniently, constituted by a pair of prismatic guides 25 which are each mounted on abutment regions 10 that are arranged along the upper portion 8a of the tubular body 8 of a respective monolithic supporting element 7, and are fixed thereto by way of screw elements 26.

Furthermore, a supporting slider 27 for supporting the processing station 5 is mounted so that it can slide on the prismatic guides 25, and the processing station is fixed to the supporting slider in order to allow the displacement thereof with respect to the prismatic guides 25; such displacement can, conveniently, be controlled by an operator, using a handwheel 28 connected to an endless screw 29 which is supported rotatably by a frame fixed to one of the prismatic guides 25 and which engages a female thread defined on a portion of the supporting slider 27.

It should be noted that, conveniently, the upper portions 8a of the tubular bodies 8 are joined, by way of respective curvilinear portions 8b with the concavity directed toward the supporting structure 2, to respective lower portions 8c which have a substantially horizontal extension.

Operation of the machine according to the invention is the following.

The monolithic supporting elements 7 of the footing 6 are connected to the supporting structure 2 of the carousel 3 in the desired position, by way of the connecting plates 13.

The position of the processing station 5 fixed to the slider 27 is adjusted by acting on the handwheel 28 with respect to the transit region of the containers 4 conveyed by the carousel.

In practice it has been found that the invention fully achieves the intended aim and objects by providing a carousel machine for processing containers in which the footing of the processing stations which are arranged around the carousel is, in addition to structurally solid and easy to provide, also far less cumbersome and free from elements that can prevent or hinder the movement of the operators around the machine.

The invention thus conceived is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The disclosures in Italian Patent Application No. 102019000000334 from which this application claims priority are incorporated herein by reference.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A carousel machine for processing containers, which comprises a supporting structure for supporting a rotating carousel that rotates about a rotation axis, for the conveyance of containers to be processed, and which is provided, at a peripheral region of said carousel, with at least one station for processing the containers in transit on said carousel, said at least one processing station being supported by a respective footing which is connected to said supporting structure, wherein said footing is mounted in a cantilever fashion jutting out from a peripheral region of the supporting structure and comprises a pair of monolithic supporting elements which lie on respective substantially vertical planes of arrangement, which face each other and are arranged substantially parallel to a direction that is substantially radial with respect to the rotation axis of said carousel, each one of said monolithic elements comprising a respective tubular body, which is substantially U-shaped and is arranged so that corresponding ends thereof are mutually superimposed along a direction that is substantially parallel to the rotation axis of said carousel and are directed towards said supporting structure, the tubular body of each one of said monolithic supporting elements having, on an outer lateral surface thereof, at least one longitudinal seat which defines at least one abutment region for a coupling to said monolithic supporting elements of removable connection means for connecting said monolithic supporting elements to said supporting structure and for a connection to said monolithic supporting elements of handling means for moving said processing station with respect to said carousel.

2. The machine according to claim 1, wherein said at least one longitudinal seat comprises a pair of longitudinal recesses which are mutually opposite with respect to an axis of extension of a corresponding tubular body, at least one portion of the delimiting walls of at least one of said recesses providing said at least one abutment region.

3. The machine according to claim 1, wherein said removable connection means comprise at least one connecting plate, which is arranged on a plane that is substantially perpendicular to the rotation axis of said carousel and is rigidly connected to said monolithic supporting elements, said at least one connecting plate having at least one opening for accommodating at least one screw or bolt element for connection to said supporting structure, multiple connecting openings being defined in said supporting structure, being distributed along the peripheral region of said supporting structure and being selectively engageable by said at least one screw or bolt element, for the connection of said monolithic supporting elements in the desired position along the peripheral region of said supporting structure.

4. The machine according to claim 3, wherein said at least one connecting plate is connected laterally to a pair of supporting blocks which are mutually opposite and are each mounted so as to rest against an abutment region which is defined on a respective monolithic supporting element.

5. The machine according to claim 1, wherein said removable connection means comprise a pair of connecting plates which are mutually spaced apart along a direction that is substantially parallel to the rotation axis of said carousel, said connecting plates being mounted on said abutment regions which are located proximate to ends of said tubular bodies.

6. The machine according to claim 1, wherein the tubular bodies of said monolithic supporting elements have upper portions which have a substantially horizontal extension, said handling means being mounted on said at least one abutment region which are located along said upper portions.

7. The machine according to claim 6, wherein said handling means comprise a pair of prismatic guides, each one mounted on said at least one abutment region that are arranged along the upper portion of the tubular body of a respective monolithic supporting element, a supporting slider for supporting said processing station being mounted so that said processing station can slide on said prismatic guides.

* * * * *